(12) United States Patent
Nishikawa

(10) Patent No.: US 11,144,341 B2
(45) Date of Patent: Oct. 12, 2021

(54) MANAGEMENT APPARATUS AND MANAGEMENT METHOD

(71) Applicant: HITACHI, LTD., Tokyo (JP)

(72) Inventor: Takeshi Nishikawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 222 days.

(21) Appl. No.: 16/331,031

(22) PCT Filed: Jul. 13, 2017

(86) PCT No.: PCT/JP2017/025626
§ 371 (c)(1),
(2) Date: Mar. 6, 2019

(87) PCT Pub. No.: WO2019/012675
PCT Pub. Date: Jan. 17, 2019

(65) Prior Publication Data
US 2019/0266002 A1   Aug. 29, 2019

(51) Int. Cl.
*G06F 9/455*   (2018.01)
*G06F 9/50*    (2006.01)
(Continued)

(52) U.S. Cl.
CPC ............ *G06F 9/45558* (2013.01); *G06F 3/06* (2013.01); *G06F 3/067* (2013.01); *G06F 3/0617* (2013.01);
(Continued)

(58) Field of Classification Search
None
See application file for complete search history.

(56) References Cited

U.S. PATENT DOCUMENTS

2008/0215793 A1* 9/2008 Hashimoto ........... G06F 9/5077
                                                     711/6
2011/0161973 A1* 6/2011 Klots ................. H04L 43/0888
                                                     718/104
(Continued)

FOREIGN PATENT DOCUMENTS

JP   2007-097222 A   4/2007
JP   2011-081588 A   4/2011
(Continued)

OTHER PUBLICATIONS

International Search Report dated Oct. 17, 2017 for the International Application No. PCT/JP2017/025626.

*Primary Examiner* — Lewis A Bullock, Jr.
*Assistant Examiner* — Melissa A Headly
(74) *Attorney, Agent, or Firm* — Volpe Koenig

(57) ABSTRACT

A management apparatus and management method capable of enhancing reliability and safety of the entire system are proposed. When any one of virtual machine no longer satisfies its performance requirement, a business computer notifies a management apparatus of an alert; a priority representing a priority level when switching a logical path is set to each virtual machine; and when the management apparatus is notified by the business computer of the alert, the management apparatus determines a combination pattern, which satisfies performance requirements for all the virtual machines and satisfies a requirement for the priority that is set to each virtual machine, and issues an instruction to the corresponding business computer and/or a storage apparatus so that a combination pattern of each logical path from each virtual machine to a logical volume allocated to that virtual machine will become the determined combination pattern.

6 Claims, 12 Drawing Sheets

(51) Int. Cl.
 *G06F 3/06* (2006.01)
 *G06F 11/07* (2006.01)
(52) U.S. Cl.
 CPC .......... *G06F 3/0635* (2013.01); *G06F 9/5077* (2013.01); *G06F 11/07* (2013.01); *G06F 2009/4557* (2013.01); *G06F 2009/45579* (2013.01); *G06F 2009/45595* (2013.01)

(56) References Cited

U.S. PATENT DOCUMENTS

| | | |
|---|---|---|
| 2012/0195187 A1 | 8/2012 | Ashihara et al. |
| 2017/0201574 A1* | 7/2017 | Luo ........................ H04L 67/34 |
| 2018/0115485 A1 | 4/2018 | Chiba |

FOREIGN PATENT DOCUMENTS

| | | |
|---|---|---|
| JP | 2015-216572 A | 12/2015 |
| JP | 2016-192661 A | 11/2016 |
| WO | 2016/152081 A1 | 9/2016 |

\* cited by examiner

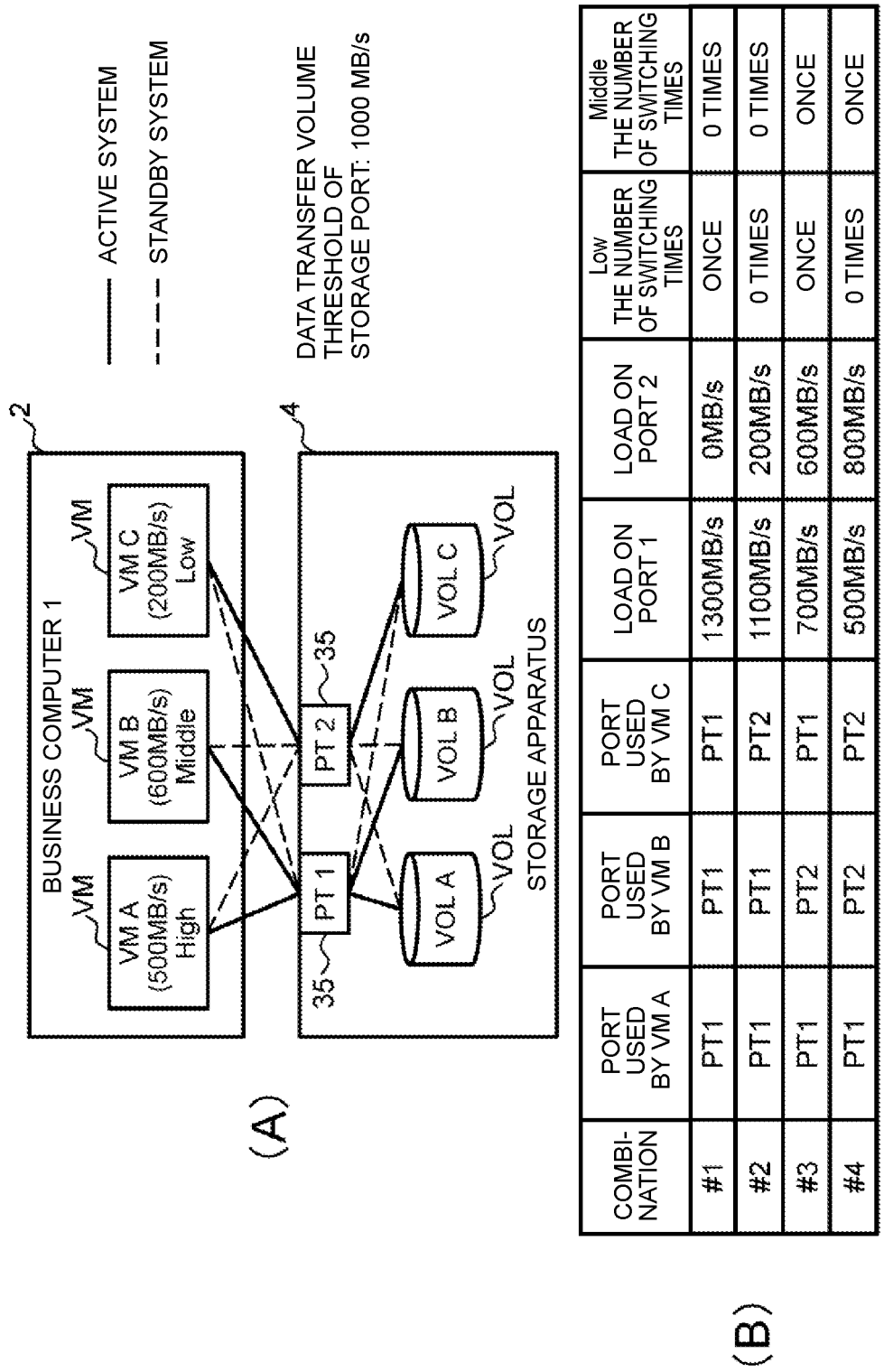

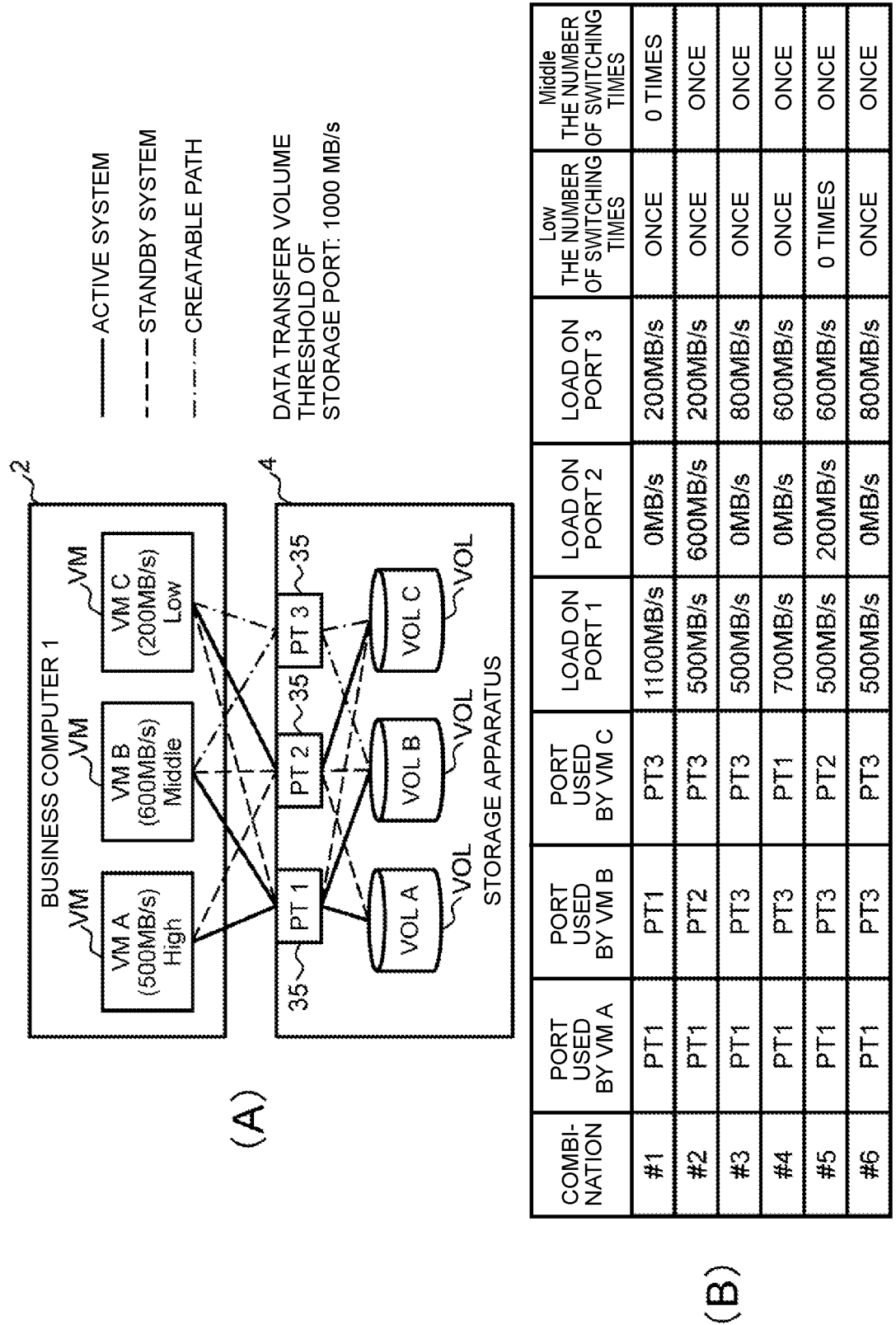

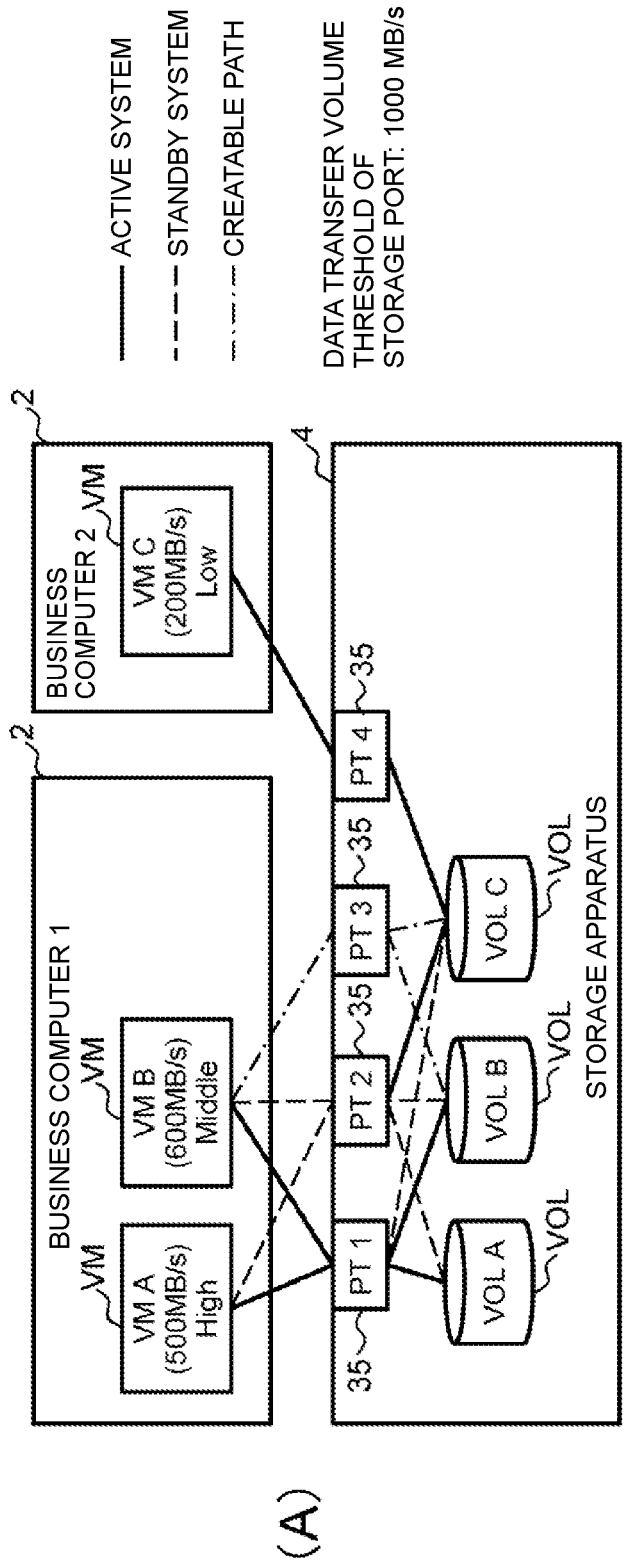

FIG.5

PATH SWITCHING CONDITION MANAGEMENT TABLE 16

(A)

| THE NUMBER OF CHECKS | THRESHOLD FOR THE NUMBER OF CHECKS | DESIGNATED TIME | DATA TRANSFER VOLUME THRESHOLD |
|---|---|---|---|
| 10 TIMES | 5 TIMES | 60 SECONDS | 300MB/s |
| 16A | 16B | 16C | 16D |

PATH SWITCHING CONDITION MANAGEMENT TABLE 16'

(B)

| THE NUMBER OF CHECKS | DESIGNATED TIME | DATA TRANSFER VOLUME THRESHOLD |
|---|---|---|
| 10 TIMES | 60 SECONDS | 300MB/s |
| 16A' | 16B' | 16C' |

FIG.6

DATA TRANSFER VOLUME THRESHOLD MANAGEMENT TABLE 43

| BUSINESS COMPUTER PORT DATA TRANSFER VOLUME THRESHOLD | STORAGE PORT DATA TRANSFER VOLUME THRESHOLD |
|---|---|
| 300MB/s | 1000MB/s |
| 43A | 43B |

FIG.7

PATH SWITCHING PREDICTED TIME MANAGEMENT TABLE44

| FIRST PREDICTED TIME (ACTIVE SYSTEM → STANDBY SYSTEM) | SECOND PREDICTED TIME (NEW PATH CREATION) |
|---|---|
| 1 SECOND | 5 SECONDS |

SYSTEM INFORMATION MANAGEMENT TABLE 45

| VM NAME | PARENT BUSINESS COMPUTER ID | PATH ATTRIBUTE | BUSINESS COMPUTER PORT ID | BUSINESS COMPUTER PORT DATA TRANSFER VOLUME (MB/s) | WWN | STORAGE PORT ID | STORAGE PORT DATA TRANSFER VOLUME (MB/s) | PRIORITY |
|---|---|---|---|---|---|---|---|---|
| VM1 |   | ACTIVE | #1 | 500 | AAA | #13 | 1100 | High |
|  | 1 | STANDBY | #2 | 0 | BBB | #14 | 200 | High |
| VM2 |   | ACTIVE | #3 | 600 | CCC | #13 | 1000 | Middle |
|  | 1 | STANDBY | #4 | 0 | DDD | #14 | 200 | Middle |
| VM3 |   | STANDBY | #5 | 0 | EEE | #13 | 1100 | Low |
|  | 1 | ACTIVE | #6 | 200 | FFF | #14 | 200 | Low |
| ... | ... | ... | ... | ... | ... | ... | ... | ... |
| 45A | 45B | 45C | 45D | 45E | 45F | 45G | 45H | 45I |

45X / 45Y pairs across rows

FIG.9

STORAGE PORT MANAGEMENT TABLE46

| STORAGE PORT ID | STORAGE PORT DATA TRANSFER VOLUME (MB/s) | COUPLED BUSINESS COMPUTER PORT WWN | COUPLING DESTI- NATION VM NAME | PATH | REG- ISTERED WWN | BUSINESS COMPUTER PORT ID | BUSINESS COMPUTER PORT DATA TRANSFER VOLUME (MB/s) | PRIORITY |
|---|---|---|---|---|---|---|---|---|
| #13 | 1100 | AAA,CCC, EEE | VM1 | LOGICAL CONNECTION | AAA | #1 | 500 | High |
| | | | VM2 | LOGICAL CONNECTION | CCC | #3 | 600 | Middle |
| | | | VM3 | LOGICAL CONNECTION | EEE | #5 | 0 | Low |
| #14 | 200 | BBB,DDD, FFF | VM1 | LOGICAL CONNECTION | BBB | #2 | 0 | High |
| | | | VM2 | LOGICAL CONNECTION | DDD | #4 | 0 | Middle |
| | | | VM3 | LOGICAL CONNECTION | FFF | #6 | 200 | Low |
| ... | ... | ... | ... | ... | ... | ... | ... | ... |
| 46A | 46B | 46C | 46D | 46E | 46F | 46G | 46H | 46I |

46X (columns 46D–46I)

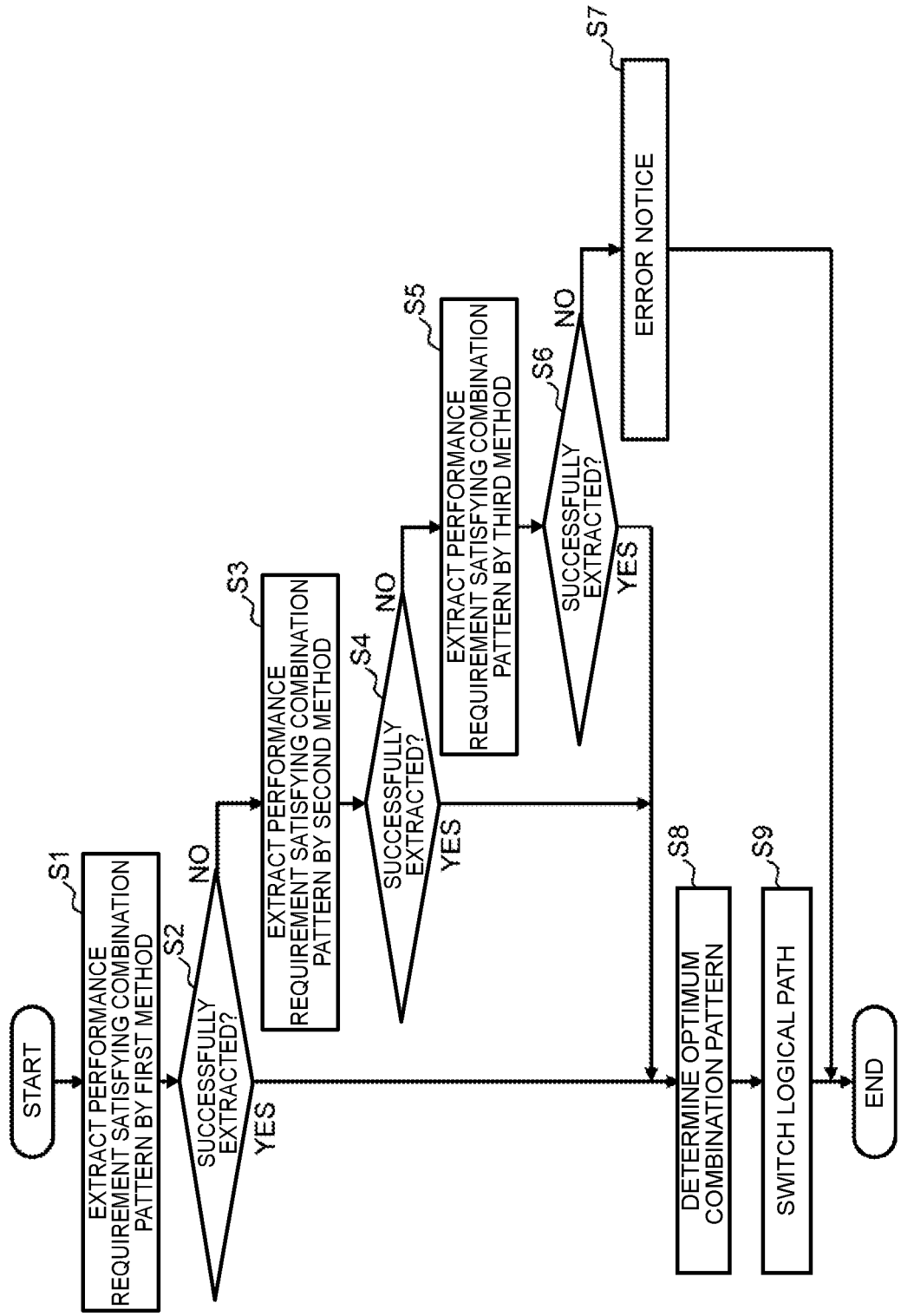

MANAGEMENT APPARATUS AND MANAGEMENT METHOD

TECHNICAL FIELD

The present invention relates to a management apparatus and a management method and is suited for use in a management apparatus and management method for managing logical paths (paths) from a business computer to a storage apparatus.

BACKGROUND ART

Conventionally, a business computer sometimes forms a multipath configuration for setting a plurality of logical paths for the purpose of redundancy and performance guarantee; and under such circumstances, multipath management software is used. The multipath management software is software that sets settings of logical paths for a standby system, in addition to an active system, as logical paths from the business computer to its communication destination (such as a storage apparatus).

A logical path is switched from the active system to the standby system according to an instruction from an application which monitors the performance of the business computer when a performance requirement that is set to that business computer in advance based on, for example, an SLA (Service Level Agreement) is no longer satisfied.

Incidentally, in relation to switching of the logical paths, PTL 1 indicated below discloses an administrative manager computer having a path switching function for the purpose of load leveling of a storage system.

Practically, when a port on an access path to a storage apparatus is overloaded, this administrative manager computer displays a list of access paths routed from ports, which are not ports with excessive access path time in the computer, via another switch to the same volume in the storage apparatus. Then, the administrative manager computer calculates a data traffic volume of each port in the relevant path when the access path to the storage apparatus is switched to a path selected from the above-mentioned list by an administrator; and when the traffic volume with respect to all the ports does not exceed a threshold value, the administrative manager computer issues a port switching instruction via the path switching function of the computer.

CITATION LIST

Patent Literature

PTL 1: Japanese Patent Application Laid-Open (Kokai) Publication No. 2007-97222

SUMMARY OF THE INVENTION

Problems to be Solved by the Invention

Meanwhile, such PTL 1 is designed so that when the path selected by the administrator satisfies the above-mentioned condition (that is, when the access path to the storage apparatus is switched, the traffic volume with respect to all the ports does not exceed the threshold value), the access path to the storage apparatus is immediately switched to that path; and, therefore, even if there are some other paths which satisfy the condition, the most appropriate path cannot be selected from these paths.

Consequently, depending on the circumstances, there is a fear that a situation where the same access path switching processing may have to be executed again with a short period of time after switching the access path to the storage apparatus might happen.

The present invention was devised in consideration of the above-described circumstances and aims at proposing a management apparatus and management method capable of switching to an optimum logical path as a logical path to which the relevant path should be switched and, as a result, enhancing reliability and safety of the entire system.

Means to Solve the Problems

In order to solve the above-described problems, provided according to the present invention is a management apparatus for managing an information processing system including one or more business computers to each of which one or more virtual machines are set, and a storage apparatus to which one or more logical volumes are set, wherein the management apparatus includes: an information collection unit that collects necessary information from each of the business computers and the storage apparatus; and a path switching control unit that controls switching of a logical path from each of the virtual machines to the logical volume allocated to the relevant virtual machine on the basis of the information collected by the information collection unit, wherein the business computer notifies the management apparatus of an alert when a load on the logical path from any one of the virtual machines to the logical volume allocated to the relevant virtual machine increases and a performance requirement which is set to the relevant virtual machine is thereby no longer satisfied; wherein a priority representing a priority level when switching the logical path is set to each of the virtual machines; wherein when the path switching control unit is notified by the business computer of the alert, the path switching control unit determines a new combination pattern, which satisfies performance requirements of all the virtual machines and satisfies a requirement for the priority that is set to each of the virtual machines, as a combination pattern of each logical path from each of the virtual machines to the logical volume allocated to the relevant virtual machine on the basis of the information collected by the information collection unit and issues an instruction to the corresponding business computer and/or the storage apparatus to switch the logical path for the virtual machine which is required so that the combination pattern of each logical path from each of the virtual machines to the logical volume allocated to the relevant virtual machine will be switched to the determined combination pattern.

Furthermore, provided according to the present invention is a management method executed by a management apparatus for managing an information processing system including one or more business computers to each of which one or more virtual machines are set, and a storage apparatus to which one or more logical volumes are set, wherein the management method includes: a first step of collecting necessary information from each of the business computers and the storage apparatus; and a second step of controlling switching of a logical path from each of the virtual machines to the logical volume allocated to the relevant virtual machine on the basis of the collected information, wherein the business computer notifies the management apparatus of an alert when a load on the logical path from any one of the virtual machines to the logical volume allocated to the relevant virtual machine increases and a performance requirement which is set to the relevant virtual machine is thereby no longer satisfied; wherein a priority representing a priority level when switching the logical path is set to each of the virtual machines; wherein in the second step, when the management apparatus is notified by the business computer of the alert, the management apparatus determines a new combination pattern, which satisfies performance requirements of all the virtual machines and satisfies a requirement for the priority that is set to each of the virtual machines, as a combination pattern of each logical path from each of the virtual machines to the logical volume allocated to the relevant virtual machine on the basis of the collected information and issues an instruction to the corresponding business computer and/or the storage apparatus to switch the logical path for the virtual machine which is required so that the combination pattern of each logical path from each of the virtual machines to the logical volume allocated to the relevant virtual machine will be switched to the determined combination pattern.

When the management apparatus and the management method according to the present invention are employed, the logical path for each virtual machine can be switched so that a combination of each logical path from each virtual machine to a logical volume allocated to the relevant virtual machine will become an optimum combination.

Advantageous Effects of the Invention

The management apparatus and management method capable of enhancing the reliability and safety of the entire system can be implemented according to the present invention.

BRIEF DESCRIPTION OF DRAWINGS

FIG. 2A is a block diagram for explaining a first method and FIG. 2B is a chart for explaining the first method;

FIG. 3A is a block diagram for explaining a second method and FIG. 3B is a chart for explaining the second method;

FIG. 4A is a block diagram for explaining a third method and FIG. 4B is a chart for explaining the third method;

FIG. 5A and FIG. 5B are charts illustrating structure examples of a path switching condition management table;

FIG. 6 is a chart illustrating a structure example of a data transfer volume threshold management table;

FIG. 7 is a chart illustrating a structure example of a path switching predicted time management table;

FIG. 8 is a chart illustrating a structure example of a system information management table;

FIG. 9 is a chart illustrating a structure example of a storage port management table;

FIG. 10 is a flowchart illustrating a processing sequence for path determination switching processing;

DESCRIPTION OF EMBODIMENTS

An embodiment of the present invention will be described below in detail with reference to the drawings.

(1) Configuration of Information Processing System According to this Embodiment

Figure 1:
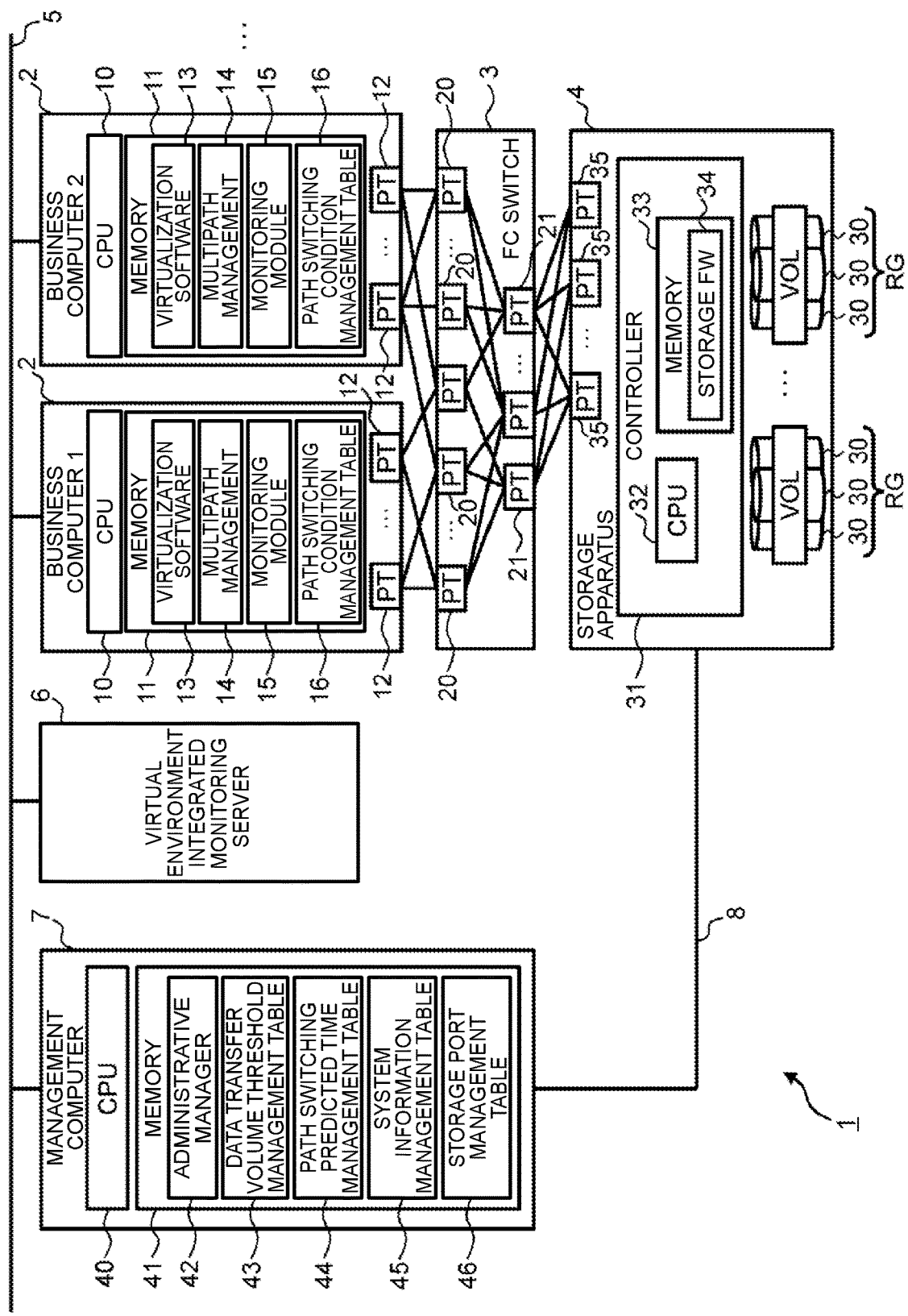
FIG. 1 is a block diagram illustrating an overall configuration of an information processing system according to this embodiment.

Referring to FIG. 1, the reference numeral 1 represents an information processing system according to this embodiment as a whole. This information processing system 1 is configured in a manner such that one or more business computers 2 are coupled to a storage apparatus 4 via an FC (Fibre Channel) switch 3 and these business computers 2 are coupled to a virtual environment integrated monitoring server 6 and a management computer 7 via a first network 5 such as a LAN (Local Area Network).

The business computer 2: is a computer device in which application software according to a user's business is mounted; and read/writes data from/to the storage apparatus 4 via the FC switch 3 in response to requests from the user or the application software.

This business computer 2 is configured by including information processing resources, such as a CPU (Central Processing Unit) 10 and a memory 11, and a plurality of ports (hereinafter referred to as the business computer ports) 12. The CPU 10 is a processor that controls the operation of the entire business computer 2. Moreover, the memory 11 is composed of, for example, a volatile semiconductor memory and is used to temporarily retain various kinds of programs. The business computer port 12 is a joining terminal coupled to external equipment or an external network.

The memory 11 for the business computer 2 stores software such as virtualization software 13, multipath management software 14, and a monitoring module 15 as well as a path switching condition management table 16.

The virtualization software 13 is software having a function that creates one or more virtual computers (hereinafter referred as the virtual machine(s) [VM: Virtual Machine(s)]) in the business computer 2 according the user's operation. Furthermore, the multipath management software 14 is software having a function that sets and manages each logical path, with respect to each virtual machine, to a logical volume allocated to the relevant virtual machine in an active system and a standby system. Incidentally, the multipath management software 14 also manages whether or not there is a physical connection from each virtual machine created in its own business computer 2 to each port (storage port 35) (which will be described later) of the storage apparatus 4.

The monitoring module 15 is a module having a function that: collect information such as an attribute of a logical path which is currently being used by each virtual machine (the active system or the standby system), a port number and its WWN (World Wide Name) of the business computer port 12 which is used by each virtual machine, and a data transfer volume per unit of time of each business computer port 12 (that is, a data transfer speed) from the multipath management software 14 in response to a request from the management computer 7; and transfers these pieces of collected information to the management computer 7 via the first network 5. The details of the path switching condition management table 16 will be explained later.

The FC switch 3 is a network device in accordance with the FC standards and is configured by including a plurality of upstream ports 20 and a plurality of downstream ports 21. Each upstream port 20 is physically and electrically coupled to any one of the business computer ports 12 on any one of the business computers 2 via, for example, an FC cable; and each downstream port 21 is physically and electrically coupled to any one of ports on the storage apparatus 4 (hereinafter referred to as the storage port(s)) via, for example, the FC cable. All data exchanges between each business computer 2 and the storage apparatus 4 are performed via this FC switch 3.

The storage apparatus 4: is configured by including one or more storage devices 30 and a storage controller 31 that controls reading/writing of data from/to these storage devices 30; and is coupled to the management computer 7 via a second network 8 such as a cable or a LAN.

The storage device 30 is composed of a large-capacity, nonvolatile storage device such as a hard disk drive and/or an SSD (Solid State Drive). One or more storage devices 30 are managed as a RAID (Redundant Arrays of Inexpensive Disks) group RG and one or more logical volumes VOL are defined in a storage area provided by each of the storage devices 30 which constitute one RAID group RG.

The storage controller 31 is configured by including information processing resources such as a CPU 32 and a memory 33. The CPU 32 is a processor that controls the operation of the entire storage apparatus 4. Moreover, the memory 33 is composed of, for example, a semiconductor memory and is used to temporarily retain various kinds of programs such as storage firmware 34. Data is written to, or read from, a logical volume(s) VOL under control of the storage controller 31 in response to a request from the business computer 2 by execution of the storage firmware 34, which is stored in the memory 33, by the CPU 32.

Incidentally, the storage firmware 34 manages information such as the number of storage ports 35 existing in the storage apparatus 4, a WWW of each business computer port 12 linked to each storage port 35, and a port number and WWN of each storage port 35. Moreover, the storage firmware 34: periodically collects and manages the data transfer volume per unit of time (data transfer speed) of each storage port 35; and also has a function that notifies the management computer 7 of these pieces of information via the second network 8 in response to a request from the management computer 7.

The virtual environment integrated monitoring server 6 is a server apparatus having a function that monitors a virtual environment in each business computer 2 in an integrated manner. Specifically speaking, the virtual environment integrated monitoring server 6 periodically collects and manages information, such as an identifier (business computer ID) of the relevant business computer 2, names of respective virtual machines (virtual machine names) which are set in that business computer 2, WWN's of business computer ports 12 used by these respective virtual machines in the active system and the standby system, and the data transfer volume per unit of time (data transfer speed) from each virtual machine which is linked to each storage port 35 of the storage apparatus 4, from each business computer 2 via the first network 5. Furthermore, the virtual environment integrated monitoring server 6 also manages a path switching priority (which will be described later) of each virtual machine, which is set by the user. Then, the virtual environment integrated monitoring server 6 notifies the management computer 7 of these pieces of information via the first network 5 in response to a request from the management computer 7.

The management computer 7: is a computer device having a function that manages a logical path(s) from each virtual machine in the system to a logical volume allocated to that virtual machine in the storage apparatus 4; and is configured by including information processing resources such as a CPU 40 and a memory 41. The CPU 40 is a processor that controls the operation of the entire management computer 7. Moreover, the memory 41 is composed of a semiconductor memory and is used to temporarily retain various kinds of programs.

The memory 41 stores an administrative manager 42 having a function that: periodically collects necessary information from the monitoring module 15 for each business computer 2 via the first network 5; and periodically collects necessary information from the storage firmware 34 for the storage apparatus 4 via the second network 8. The administrative manager 42 stores and manages the collected information in a system information management table 45 and a storage port management table 46 which will be described later. Incidentally, a data transfer volume threshold management table 43 and a path switching predicted time management table 44 which will be described later are also stored and retained in this memory 41.

(2) Path Switching Function According to this Embodiment (2-1) Details of Path Switching Function Next, the path switching function mounted in this information processing system 1 will be explained.

Regarding each virtual machine in the business computer 2 in which the monitoring module 15 is mounted, the monitoring module 15 mounted in each business computer 2 monitors the load on a logical path from the relevant virtual machine to a logical volume, which is allocated to that virtual machine, in the storage apparatus 4. In this embodiment, the data transfer volume per unit of time (the data transfer speed) of each business computer port 12 to which the relevant logical path is coupled is acquired, as the above-described load, from the multipath management software 14 and monitored.

Then, when an increase of the load on the logical path for any one of the virtual machines results in reduction of the data transfer volume per unit of time (the data transfer speed) of the business computer port 12, through which the relevant logical path is routed, and the performance requirement for the data transfer speed of the relevant virtual machine is thereby no longer satisfied, the monitoring module 15 notifies the administrative manager 42 of an alert to that effect.

Meanwhile, the administrative manager 42 periodically collects necessary information from the monitoring module 15 of each business computer 2, the storage firmware 34 of the storage apparatus 4, and the virtual environment integrated monitoring server 6.

This information also includes the priority representing a priority level, which is set by the user in advance for each of the virtual machines, for switching the logical path coupled to that virtual machine (hereinafter, referred to as the "path switching priority"). In other words, in the case of the information processing system 1, the user is able to, when creating a virtual machine, set the path switching priority for that virtual machine to one of "High," "Middle" or "Low." "High" is a priority with a policy of "allowing absolutely no changes to the logical path," while "Middle" is a priority with a policy of "as much as possible allowing no changes to the logical path." Furthermore, "Low" is a priority with a policy of "changes to the logical path being allowed."

Then, in the event of notification of the above-mentioned alert from any of the monitoring modules 15, the administrative manager 42 calculates, based on the information gathered up to that point in time, all combination patterns (hereinafter referred to as the "performance requirement satisfying combination patterns") possible as new logical path (when the logical path can be switched, then the logical path it is switched to, and the original logical path when the logical path cannot be switched) combinations from each of the virtual machines to the logical volumes allocated to those virtual machines where all virtual machines within the system satisfy the performance requirements.

Moreover, in this embodiment, a threshold value for the data transfer volume per unit of time for each of the storage ports 35 (hereinafter referred to as the "storage port data transfer volume threshold") is set by the user in advance; and when the data transfer volume per unit of time for the storage port 35 is less than the storage port data transfer volume threshold, then the administrative manager 42 determines that the virtual machine using the logical path coupled to the storage port 35 satisfies the performance requirements.

Furthermore, from among the performance requirement satisfying combination patterns calculated as described above, the administrative manager 42 takes into consideration each of the respective path switching priorities set for each of the virtual machines, determines a single optimum performance requirement satisfying combination pattern as the optimum combination pattern, and issues an instruction to the required monitoring module 15 and the storage firmware 34 of the storage apparatus 4 for the corresponding logical path creation and/or switching so that the logical path combination from each of the virtual machines to the logical volume allocated to that virtual machine becomes the optimum combination pattern.

Specifically, when determining the optimum combination pattern, the administrative manager 42 first uses the first method, which involves switching the logical paths of some or all of the virtual machines for which the path switching priority has been set to "Middle" or "Low" from the active system to the standby system, to judge whether the above-mentioned calculation for the performance requirement satisfying combination pattern is possible or not.

Then, when the administrative manager 42 is able to calculate the relevant performance requirement satisfying combination pattern using the first method, it takes into account the path switching priorities set for each of the virtual machines, and determines a single optimum performance requirement satisfying combination pattern from among the calculated performance requirement satisfying combination patterns to be the above-mentioned optimum combination pattern. After that, the administrative manager 42 then issues an instruction to the monitoring module 15 of the corresponding business computer 2 to switch the logical path in the required virtual machine so that the logical path combination from each of the virtual machines to the corresponding logical volumes becomes the optimum combination pattern.

Furthermore, when the administrative manager 42 is unable to calculate the performance requirement satisfying combination pattern using the above-mentioned first method, it uses the second method, which involves creating new logical paths for some or all of the virtual machines for which the path switching priority has been set to "Middle" or "Low," to judge whether the above-mentioned calculation for the performance requirement satisfying combination pattern satisfying the performance requirements for each of the virtual machines is possible or not.

Then, when the administrative manager 42 is able to calculate the performance requirement satisfying combination pattern using the second method, it takes into account the path switching priorities set for each of the virtual machines, and determines a single optimum performance requirement satisfying combination pattern from among the calculated performance requirement satisfying combination patterns to be the optimum combination pattern. After that, the administrative manager 42 then issues an instruction to the storage firmware 34 of the storage apparatus 4 and the monitoring module 15 of the corresponding business computer 2 to switch the logical path in the required virtual machine so that the logical path combination for each of the virtual machines becomes the optimum combination pattern.

Furthermore, when the administrative manager 42 is unable to calculate the performance requirement satisfying combination pattern even using the above-mentioned second method, it uses the third method, which involves migrating some or all of the virtual machines for which the path switching priority has been set to "Middle" or "Low" to another business computer 2, to judge whether the above-mentioned calculation for the performance requirement satisfying combination pattern satisfying the performance requirements for each of the virtual machines is possible or not.

Then, when the administrative manager 42 is able to calculate the above-mentioned performance requirement satisfying combination pattern using the third method, it takes into account the path switching priorities set for each of the virtual machines, and determines a single optimum performance requirement satisfying combination pattern from among the calculated performance requirement satisfying combination patterns to be the optimum combination pattern. After that, the administrative manager 42 then issues an instruction to the monitoring module 15 of the corresponding business computer 2 to switch the logical path in the required virtual machine so that the logical path combination in each of the virtual machines becomes the optimum combination pattern.

Incidentally, when the administrative manager 42 is unable to generate the performance requirement satisfying combination pattern even using the above-mentioned third method, it notifies the administrator to that effect.

Now, a more detailed explanation of the above-mentioned first method will be provided. In the first method, the administrative manager 42 calculates, based on the information collected from each of the monitoring modules 15, all combination patterns that are possible as combinations of logical paths in the active system and logical paths in the standby system for each of the virtual machines, after having fixed the logical path in the virtual machine with its path switching priority set to "High" as the current logical path. The administrative manager 42 also extracts, from among these calculated combination patterns, the combination patterns that satisfy the performance requirements of all of the virtual machines and also satisfy the respective path switching priority requirements set for each of the virtual machines, as the above-mentioned performance requirement satisfying combination patterns.

For example, as illustrated in FIG. 2A, consider the case where, in the information processing system 1, only the virtual machines VM called "VM A," "VM B," and "VM C" set inside the business computer 2 called "business computer 1" exist, in which "VM A" is coupled with the logical volume VOL called "VOL A" via the storage port 35 called "PT1" of the storage apparatus 4, "VM B" is coupled with the logical volume VOL called "VOL B" via the storage port 35 called "PT1" of the storage apparatus 4, and "VM C" is coupled with the logical volume VOL called "VOL C" via the storage port 35 called "PT2" of the storage apparatus 4. Furthermore, in FIG. 2A, of the respective lines joining the virtual machines VM and the storage ports 35, and the storage ports 35 and the logical volumes VOL, solid lines represent the logical paths in the active system, while broken lines represent the logical paths in the standby system.

Under this circumstance, it is assumed that "VM A" has a data transfer volume per unit of time of "500 MB/s" and a path switching priority of "High," "VM B" has a data transfer volume per unit of time of "600 MB/s" and a path switching priority of "Middle," and "VM C" has a data transfer volume per unit of time of "200 MB/s" and a priority relating to path switching of "Low." Furthermore, it is also assumed that the storage port data transfer volume threshold is "1,000 MB/s."

In this case, as the path switching priority for "VM A" is "High," the administrative manager 42 fixes the storage port 35 used by "VM A" as "PT1," which is currently being used by the above-mentioned "VM A," after which it calculates all possible combination patterns for each of the logical paths for "VM A," "VM B" and "VM C" in situations where the logical paths respectively used by "VM B," which has the path switching priority of "Middle," and "VM C," which has the path switching priority of "Low," are set to either the active system or the standby system. In this example, as such combination patterns, four combination patterns such as those shown in FIG. 2B are calculated.

As is obvious from FIG. 2B, in the combination patterns "#1" and "#2," the data transfer volume per unit of time (data transfer speed) for "PT1" in both exceeds the storage port data transfer volume threshold, so it is judged that the virtual machine VM using "PT1" (the combination in the case of "#1" is "VM A," "VM B" and "VM C," while the combination in the case of "#2" is "VM A" and "VM B") is unable to satisfy the performance requirements. Accordingly, the two combination patterns "#3" and "#4" are extracted as the performance requirement satisfying combination patterns that satisfy the performance requirements of all of the virtual machines VM and also satisfy the respective path switching priority requirements for each of the virtual machines VM.

Subsequently, from among the performance requirement satisfying combination patterns extracted as described above ("#3" and "#4"), the administrative manager 42 determines the performance requirement satisfying combination pattern with the lowest number of switching times for the logical paths as the above-mentioned optimum combination pattern.

When doing so, in cases where there is a plurality of performance requirement satisfying combination patterns with the lowest number of switching times for the logical paths, the administrative manager 42 will arbitrarily determine, from among the plurality of performance requirement satisfying combination patterns with the lowest number of switching times for the logical paths for virtual machines VM and with the path switching priority set to "Middle," a single performance requirement satisfying combination pattern to be the optimum combination pattern.

By determining the optimal combination pattern using a process such as this, the possibility of a virtual machine with its path switching priority set to "Middle" ceasing operation due to the switching of the logical path can be kept to a minimum.

Accordingly, in the case of the example in FIG. 2B, of the two combination patterns "#3" and "#4" (the performance requirement satisfying combination patterns), the performance requirement satisfying combination pattern "#4," which is achievable with a single logical path switch, will be determined as the optimum combination pattern.

In this way, the administrative manager 42 then issues an instruction to the monitoring module 15 of the corresponding business computer 2 to switch the logical path in the required virtual machines so that the logical path combination in each of the virtual machines becomes that optimum combination pattern.

Next, a more detailed explanation of the above-mentioned second method will be provided. In the case of the second method, the administrative manager 42 judges, with respect to any of the virtual machines for which the path switching priority has been set to "Middle" or "Low," whether or not it is able to create a new logical path (hereinafter referred to as a "new path") that to the extent possible uses unused storage ports 35 in the storage apparatus 4.

Then, when a virtual machine for which a new path can be made exists among the virtual machines for which the path switching priority has been set to "Middle" or "Low," the administrative manager 42, after having fixed the logical path in the virtual machine for which the path switching priority has been set to "High" as the current logical path, calculates all the combination patterns that are possible as logical path combinations in each of the virtual machines in the case of its having created a new path in the above-mentioned virtual machines. The administrative manager 42 also extracts, from these calculated combination patterns, the combination patterns that satisfy the performance requirements of all of the virtual machines and also satisfy the respective path switching priority requirements set for each of the virtual machines, as the above-mentioned performance requirement satisfying combination patterns.

For example, in the example shown in FIG. 3A, which uses the same reference numerals for sections corresponding to those in FIG. 2A, when there is a physical connection that exists between each of the virtual machines VM called "VM B" and "VM C" and the storage port 35 called "PT3" in the storage apparatus 4, a new path can be created as illustrated in FIG. 3A with a dot-and-dash line.

In this case, as the path switching priority for "VM A" is "High," the administrative manager fixes the storage port 35 used by "VM A" as "PT1," which is currently being used by the above-mentioned "VM A," after which it calculates combination patterns for each of the logical paths for "VM A," "VM B" and "VM C" in situations where new paths are made for "VM B," which has the path switching priority of "Middle," or "VM C," which has the path switching priority of "Low." In this example, as such combination patterns, six combination patterns such as those shown in FIG. 3B are calculated.

As is obvious from FIG. 3B, in the combination pattern "#1," the data transfer volume per unit of time (data transfer speed) for the storage port 35 called "PT1" exceeds the storage port data transfer volume threshold, so it is judged that the performance requirements of the virtual machines VM using "PT1" ("VM A" and "VM B") are unable to be satisfied. Accordingly, in this case, all five of the combination patterns "#2" to "#6" (other than "#1") are extracted as the performance requirement satisfying combination patterns in which all of the virtual machines VM satisfy the conditions relating to path switching priority and all of the virtual machines VM also satisfy the performance requirements.

Subsequently, from among the five performance requirement satisfying combination patterns, the administrative manager 42 selects a single performance requirement satisfying combination pattern using a method similar to the method described above with respect to the first method, and determines the selected performance requirement satisfying combination pattern to be the above-mentioned optimum combination pattern.

Accordingly, in the example in FIG. 3B, of the five combination patterns "#2" to "#6" (the performance requirement satisfying combination patterns), the performance requirement satisfying combination pattern "#5," which has the lowest number of switching times for its logical paths, will be determined as the optimum combination pattern.

In this way, the administrative manager 42 then issues an instruction to the storage firmware 34 of the storage apparatus 4 and the monitoring module 15 of the corresponding business computer 2 to switch the logical path in the required virtual machine after creating the required new paths, so that the logical path combination for each of the virtual machines VM becomes that optimum combination pattern.

Next, a more detailed explanation of the above-mentioned third method will be provided. In the case of the third method, the administrative manager 42 judges whether or not it is able to migrate any of the virtual machines for which the path switching priority has been set to "Middle" or "Low" to another business computer 2.

Then, when a virtual machine that is able to be migrated to another business computer 2 exists, the administrative manager 42, after having fixed the logical path in the virtual machine for which the path switching priority has been set to "High" as the current logical path, calculates all of the combination patterns for the logical paths in each of the virtual machines in the case of its having migrated the virtual machine that was able to be migrated to the above-mentioned other business computer 2. The administrative manager 42 also extracts, from these calculated combination patterns, the combination patterns that satisfy the performance requirements of all of the virtual machines and also satisfy the respective path switching priority requirements set for each of the virtual machines, as the above-mentioned performance requirement satisfying combination patterns.

For example, in the example shown in FIG. 2A, as illustrated in FIG. 4A, which uses the same reference numerals for sections corresponding to those in FIG. 2A, when the virtual machine VM called "VM C" is migrated from the "business computer 1" to the "business computer 2," and a logical path running through the storage port 35 called "PT4" can be created as the logical path for "VM C," logical paths such as those shown in FIG. 4A exist for each of the virtual machines VM.

In this case, as the path switching priority for "VM A" is "High," the administrative manager 42 fixes the storage port 35 used by "VM A" as "PT1," which is currently being used by the above-mentioned "VM A," after which it calculates all combination patterns that are possible as combinations for each of the paths for "VM A," "VM B" and "VM C" in situations where "VM B," which has the path switching priority of "Middle," or "VM C," which has the path switching priority of "Low," is migrated to the "business computer 2." In this example, as such combination patterns, six combination patterns such as those shown in FIG. 4B are calculated.

As is obvious from FIG. 4B, in the combination pattern "#1" the data transfer volume per unit of time (data transfer speed) for the storage port 35 called "PT1" exceeds the storage port data transfer volume threshold, so it is judged that the performance requirements of the virtual machines VM using "PT1" ("VM A" and "VM B") are unable to be satisfied. Accordingly, in this case, the five combination patterns "#2" to "#6" (other than "#1") are extracted as the performance requirement satisfying combination patterns in which all of the virtual machines VM satisfy the conditions relating to priority and all of the virtual machines VM also satisfy the performance requirements.

Subsequently, from among the five performance requirement satisfying combination patterns, the administrative manager 42 selects a single performance requirement satisfying combination pattern using a method similar to the method described above with respect to the first method, and determines the selected performance requirement satisfying combination pattern to be the above-mentioned optimum combination pattern.

Accordingly, in the example in FIG. 4B, of the five combination patterns "#2" to "#6" (the performance requirement satisfying combination patterns), the performance requirement satisfying combination pattern "#5," which has the lowest number of switching times for its logical path, will be determined as the optimum combination pattern.

In this way, the administrative manager 42 then issues an instruction to the storage firmware 34 of the storage apparatus 4 and the monitoring module 15 of the corresponding business computer 2 to switch the logical path in the required virtual machines after migrating the required virtual machine VM to the corresponding other business computer 2, so that the logical path combination for each of the virtual machines VM becomes that optimum combination pattern.

Incidentally, as the above-mentioned first method is only a switch to the standby system in which the logical paths in some or all of the virtual machines VM have already been set, the processing for switching the paths ends instantly. Meanwhile, the above-mentioned second method requires the creation of the new logical path within the storage apparatus 4 and the execution of an Inquiry command by the business computer 2, so it requires more time compared to the first method. Furthermore, the above-mentioned third method requires processing for the new boot-up of the virtual machine VM on the business computer 2 that is the migration destination for the virtual machine VM, so it will require even more time compared to the second method.

Accordingly, by judging whether the combination pattern in which all of the virtual machines VM satisfy the conditions relating to path switching priority and all of the virtual machines VM also satisfy the performance requirements exists using the first method, the second method, and the third method in that order as described above, the amount of time required to switch to a new logical path can be kept to a minimum.

In addition, according to the first method, as the load is concentrated on the storage port 35 currently being used, compared to the second method, the likelihood of the data transfer volume per unit of time for the individual storage ports 35 exceeding the storage port data transfer volume threshold becomes greater, but it has the merit of being able to keep unused storage ports 35 for the virtual machines that carry out important processing.

Furthermore, according to the second method, while there is the risk of the number of the storage ports 35 being used increasing, compared to the first method, the load is dispersed across more of the storage ports 35, so it has the merit of a lower likelihood of the data transfer volume per unit of time for the storage ports 35 exceeding the storage port data transfer volume threshold.

In this way, the first and the second methods each have respective merits and demerits, so with respect to the first and the second methods, it is permissible to enable the user to freely select and set the processing order. In addition, it is also permissible to enable the user to switch the order of execution of the first and the second methods, so that a judgement according to the first method is executed after a judgement according to the second method. In this case, all that would be necessary would be for the administrative manager 42 to, in response to that kind of operation executed by a user on the management computer 7, switch the internal settings for the processing order for the first and the second methods, so that a judgement according to the first method would be executed after a judgement according to the second method.

(2-2) Structures of Various Tables

As a means to realize the path switching function according to this embodiment such as is described above, the memory 11 (FIG. 1) of the business computer 2 stores the path switching conditions management table 16 (FIG. 1) as mentioned above, while the memory 41 (FIG. 1) of the management computer 7 stores the data transfer volume threshold management table 43, the path switching predicted time management table 44, the system information management table 45, and the storage port management table 46.

The path switching conditions management table 16 is a table used in order to manage the conditions, which are set by the user when initially setting up the environment, for notification by the monitoring module 15 of the above-mentioned alert to the administrative manager 42 (hereinafter referred to as the "path switching conditions"), and as illustrated in FIG. 5A, includes a number-of-checks column 16A, a threshold-for-the-number-of-checks column 16B, a designated time column 16C, and a data transfer speed the threshold value column 16D.

Furthermore, the designated time column 16C stores the time set by the user relating to the above-mentioned path switching conditions (hereinafter referred to as the "designated time"), while the number of checks column 16A stores the number of times set by the user as the number of times the data transfer volume per unit of time for each business computer port 12 should be checked within that designated time (hereinafter referred to as the "number of checks").

In addition, the data transfer speed threshold value column 16D stores the data transfer volume which is set by the user as the threshold value for the data transfer speed per unit of time for the business computer port (hereinafter referred to as the "business computer port data transfer volume threshold"), while the threshold-for-the-number-of-checks column 16B stores, from among the above-mentioned number of checks, the number of times the data transfer volume per unit of time for any of the business computer ports 12 falls below the above-mentioned business computer port data transfer speed threshold, which is required to judge that the data transfer speed for a logical path has dropped.

Accordingly, in the case of the example in FIG. 5A, it shows that a setting has been made that should notifies the administrative manager 42 of the above-mentioned alert when the data transfer volume per unit of time (the data transfer speed) is checked "10 times" during "60 seconds," and, of those times, the data transfer volume per unit of time for any one of the business computer ports 12 falls below the "300 MB/s" which is set as the business computer port data transfer volume threshold "5 times" or more.

Furthermore, the data transfer volume threshold management table 43 is a table used in order to manage the data transfer volume threshold per unit of time for the business computer port 12 (the business computer port data transfer volume threshold) and the data transfer volume threshold per unit of time for the storage port 35 (the storage port data transfer volume threshold), which are set by the user when initially setting up the environment, and as illustrated in FIG. 6, includes a business computer port data transfer volume threshold column 43A, and a storage port data transfer volume threshold column 43B.

Furthermore, the business computer port data transfer volume threshold column 43A stores the business computer port data transfer volume threshold set by the user; and the storage port data transfer volume threshold column 43B stores the storage port data transfer volume threshold set by the user.

Accordingly, in the case of FIG. 6, it is shown that the business computer port data transfer volume threshold is set to "300 MB/s", while the storage port data transfer volume threshold is set to "1,000 MB/s."

Incidentally, notification of the business computer port data transfer volume threshold set in the data transfer volume threshold management table 43 is given by the administrative manager 42 at a specified time to each of the respective monitoring modules 15 of the each of the business computers 2 after start-up of the management computer 7. In this way, each of the monitoring modules 15 will then monitor the data transfer volume per unit of time (data transfer speed) for each of the business computer ports 12 based on the business computer port data transfer volume threshold notified from the administrative manager 42.

The path switching predicted time management table 44 is a table used in order to manage the times, which are set by the user when initially setting up the environment, predicted as being required to switch the logical paths from the virtual machines to the corresponding logical volumes, and as illustrated in FIG. 7, includes a first predicted time column 44A and second predicted time column 44B.

Furthermore, the first predicted time column 44A stores the predicted value for the time required to switch the logical path from the virtual machine to the corresponding logical volume from the active system to the standby system (hereinafter referred to as the "first predicted time"); and the second predicted time column 44B stores the predicted value for the time required to create a new path as the logical path from the virtual machine to the corresponding logical volume and switch the logical path to the new path (hereinafter referred to as the "second predicted time").

Accordingly, in the case of the example in FIG. 7, it is shown that the first predicted time has been set to "1 second," while the second predicted time has been set to "5 seconds."

Meanwhile, the system information management table 45 is a table used in order to retain and manage the various kinds of information collected by the administrative manager 42 from the monitoring modules 15 of the respective business computers 2, the storage firmware 34 (FIG. 1) in the storage apparatus 4, and the virtual environment integrated monitoring server 6 (FIG. 1). This system information management table 45 is, as illustrated in FIG. 8, includes a virtual machine name column 45A, a parent business computer ID column 45B, a path attribute column 45C, a business computer port ID column 45D, a business computer port data transfer volume column 45E, a WWN column 45F, a storage port ID column 45G, a storage port data transfer volume column 45H, and a priority column 45I.

Furthermore, the virtual machine name column 45A stores the respective virtual machine names for each of the virtual machines set in this information processing system 1; and the parent business computer ID column 45B stores the identification number (the business computer ID) for the business computer (parent business computer) 2 for which the corresponding virtual machine has been set.

In addition, the path attribute column 45C, the business computer port ID column 45D, the business computer port data transfer volume column 45E, the WWN column 45F, the storage port ID column 45G, the storage port data transfer volume column 45H, and the priority column 45I are each divided into an active system field 45X and a standby system field 45Y.

Moreover, the active system field 45X of the path attribute column 45C stores the information indicating the attribute of the logical path in the active system in the corresponding virtual machine (the information indicating it is in the "active system"), while the standby system field 45Y of the path attribute column 45C stores the information indicating the attribute of the logical path in the standby system in the corresponding virtual machine (the information indicating it is in the "standby system").

Furthermore, the active system field 45X and the standby system field 45Y of the business computer port ID column 45D respectively store the identifier of the business computer port 12 (FIG. 1) coupled to the logical path with the corresponding attribute (the active system or the standby system) in the corresponding virtual machine in the parent business computer 2.

In addition, the active system field 45X and the standby system field 45Y of the business computer port data transfer volume column 45E respectively store the last collected data transfer volume per unit of time for the corresponding business computer port 12 (the business computer port 12 coupled to the logical path with the corresponding attribute [the active system or the standby system] in the corresponding virtual machine) in the corresponding parent business computer 2. Moreover, the active system field 45X and the standby system field 45Y of the WWN column 45F respectively store the WWN of the corresponding business computer port 12 in the corresponding parent business computer 2.

The active system field 45X and the standby system field 45Y of the storage port ID column 45G respectively store the identifier of the storage port 35 (FIG. 1) (the storage port ID) of the storage apparatus 4 coupled to the logical path with the corresponding attribute (the active system or the standby system) in the corresponding virtual machine, while the active system field 45X and the standby system field 45Y of the storage port data transfer volume column 45H respectively store the last collected data transfer volume per unit of time for the corresponding storage port 35.

Moreover, the active system field 45X and the standby system field 45Y of the priority column 45I respectively store the path switching priority set by the user for the corresponding virtual machine.

Accordingly, in the case of the example in FIG. 8, it is shown that for the virtual machine called "VM1," the business computer 2 with a business computer ID of "1" has been set, and that the path switching priority has been set to "High."

Furthermore, it is also shown that the active system logical path of this virtual machine is coupled to the business computer port 12 assigned the WWN of "AAA" and that has the data transfer volume per unit of time of "500 MB/s" and the business computer port ID of "#1," and the storage port 35 that has the data transfer volume per unit of time of "1,100 MB/s" and the storage port ID of "#13."

Furthermore, it is also shown that the standby system logical path of this virtual machine is coupled to the business computer port 12 assigned the WWN of "BBB" and that has the data transfer volume per unit of time of "0 MB/s" and the business computer port ID of "#2," and the storage port 35 that has the data transfer volume per unit of time of "200 MB/s" and the storage port ID of "#14."

Meanwhile, the storage port management table 46 is a table used when confirming whether or not a new logical path is able to be created in the storage apparatus 4, and as illustrated in FIG. 9, includes a storage port ID column 46A, a storage port data transfer volume column 46B, a coupled business computer port WWN column 46C, a coupling destination VM name column 46D, a path column 46E, a registered WWN column 46F, a business computer port ID column 46G, a business computer port data transfer volume column 46H, and a priority column 46I.

Furthermore, the storage port ID column 46A stores all storage port IDs set for each of the storage ports 35 in the storage apparatus 4, while the storage port data transfer volume column 46B stores the last collected data transfer volume per unit of time for the corresponding storage port 35. Moreover, the coupled business computer port WWN column 46C stores all of the WWNs for each of the business computer ports 12 coupled to the corresponding storage port 35.

Furthermore, the coupling destination VM name column 46D, the path column 46E, the registered WWN column 46F, the business computer port ID column 46G, the business computer port data transfer volume column 46H, and the priority column 46I are each divided into one or more VM fields 46X respectively established corresponding to the virtual machines coupled to either the active system or the standby system logical paths of the corresponding storage ports 35.

Moreover, each of the VM fields 46X in the coupling destination VM name column 46D respectively store the name of a different virtual machine with any logical path coupled to the corresponding storage port 35.

Furthermore, each of the VM fields 46X in the path column 46E respectively store the state of the path from the corresponding virtual machine to the logical volume allocated to that virtual machine. Furthermore, as these states, "physical connection exists," which indicates that there is a physical connection from the corresponding virtual machine to the logical volume allocated to that virtual machine but no logical path has been set, and "logical connection," which indicates that a logical path has already been set from the corresponding virtual machine to the logical volume allocated to that virtual machine.

Moreover, each of the VM fields 46X in the registered WWN column 46F respectively store the WWN of the business computer port 12 coupled to the logical path coupled to the corresponding storage port 35 in the corresponding virtual machine.

In addition, each of the VM fields 46X in the business computer port ID column 46G respectively store the business computer port ID of the business computer port 12 to which the corresponding WWN has been assigned, while each of the VM fields in the business computer port data transfer volume column 46H respectively store the last collected data transfer volume per unit of time for the corresponding business computer port 12.

Furthermore, the priority column 46I stores the path switching priority set for the virtual machine with its VM name stored in the coupling destination VM name column 46D.

Accordingly, in the case of the example in FIG. 9, it is shown that the storage port 35 with the storage port ID of "#13" has the data transfer volume per unit of time of "1,100 MB/s," and is coupled ("logical connection") via a logical path to the virtual machine called "VM1" with a path switching priority set to "High" via a business computer port 12 with a WWN of "AAA," a business computer port ID of "#1," and the data transfer volume per unit of time of "500 MB/s."

(3) Various Processing Relating to the Path Switching Function of this Embodiment Next, an explanation will be provided of the specific content of the various kinds of processing executed in relation to the path switching function of this embodiment. Furthermore, while the below explanation is provided with the administrative manager 42, the monitoring module 15 or the multipath management software 14 as the processing subject for the various kinds of processing, it is needless to say that the processing is actually executed by the corresponding CPU 40, 10 based on the administrative manager 42, the monitoring module 15, or the multipath management software 14.

(3-1) Path Determination Switching Processing

FIG. 10 illustrates the specific processing content for the path determination switching processing executed by the administrative manager 42 of the management computer 7 in the case where the above-mentioned alert is given from the monitoring module 15 mounted in any business computer 2.

When the administrative manager 42 receives the above-mentioned alert, it starts the path determination switching processing illustrated in this FIG. 10 and firstly executes the first performance requirement satisfying combination pattern extraction processing that extracts the performance requirement satisfying combination pattern in which all of the virtual machines satisfy the path switching priority conditions and all of the virtual machines also satisfy the performance requirements, by using the first method that switches the logical paths of some or all of the virtual machines from the active system to the standby system (S1). Specifically, the administrative manager 42, using the method described above with respect to FIG. 2, extracts the above-mentioned performance requirement satisfying combination pattern from among all combination patterns for the logical paths in each of the virtual machines.

Subsequently, the administrative manager 42, through the first performance requirement satisfying combination pattern extraction processing, judges whether or not the performance requirement satisfying combination pattern has been successfully extracted (S2). Furthermore, if the administrative manager 42 obtains an affirmative result in this judgement, it proceeds to step S8.

On the other hand, if the administrative manager 42 obtains a negative result in the judgement in step S2, it executes the second performance requirement satisfying combination pattern extraction processing that extracts the performance requirement satisfying combination pattern in which all of the virtual machines satisfy the path switching priority conditions and all of the virtual machines also satisfy the performance requirements, by using the second method that involves creating new logical paths for some or all of the virtual machines (S3). Specifically, the administrative manager 42, using the method described above with respect to FIG. 3, extracts the above-mentioned performance requirement satisfying combination pattern from among all combination patterns for the logical paths in each of the virtual machines.

Subsequently, the administrative manager 42, through the above-mentioned second performance requirement satisfying combination pattern extraction processing, judges whether or not the performance requirement satisfying combination pattern has been successfully extracted (S4). Furthermore, if the administrative manager 42 obtains an affirmative result in this judgement, it proceeds to step S8.

On the other hand, if the administrative manager 42 obtains a negative result in the judgement in step S4, it executes the third performance requirement satisfying combination pattern extraction processing that extracts the performance requirement satisfying combination pattern in which all of the virtual machines satisfy the path switching priority conditions and all of the virtual machines also satisfy the performance requirements, by using the third method that involves migrating some or all of the virtual machines to another business computer 2 (S5). Specifically, the administrative manager 42, using the method described above with respect to FIG. 4, extracts the above-mentioned performance requirement satisfying combination pattern from among all combination patterns for the logical paths in each of the virtual machines.

Subsequently, the administrative manager 42, through the above-mentioned third performance requirement satisfying combination pattern extraction processing, judges whether or not the performance requirement satisfying combination pattern has been successfully extracted (S6). Furthermore, if the administrative manager 42 obtains an affirmative result in this judgement, it proceeds to step S8.

On the other hand, if the administrative manager 42 obtains a negative result in the judgement in step S6, it notifies the administrator of an error message that states that there is no path switching candidate (S7), and then it terminates the path switching processing.

Meanwhile, when the administrative manager 42 has been able to extract the performance requirement satisfying combination patterns in step S2, step S4 or step S6, it selects a single optimum performance requirement satisfying combination pattern from among the extracted performance requirement satisfying combination patterns, and determines this to be the optimum combination pattern (S8).

Subsequently, the administrative manager 42 then causes the logical paths in each of the required virtual machines to be switched (S9), so that the logical path combination in each of the virtual machines becomes the optimum combination pattern determined in step S8, after which it terminates the path switching processing.

(3-2) Business-Computer-Side Path Switching Processing

Now, in the case of an affirmative result in the path determination switching processing in step S2 described above with respect to FIG. 10, the content of the processing for the administrative manager 42 in step S9 is just the provision of the instruction to the required business computers 2 to the effect that the logical path in the required virtual machines should be switched from the active system to the standby system, so that the logical path combination pattern in each of the virtual machines becomes the optimum combination pattern determined in S8.

Figure 11:
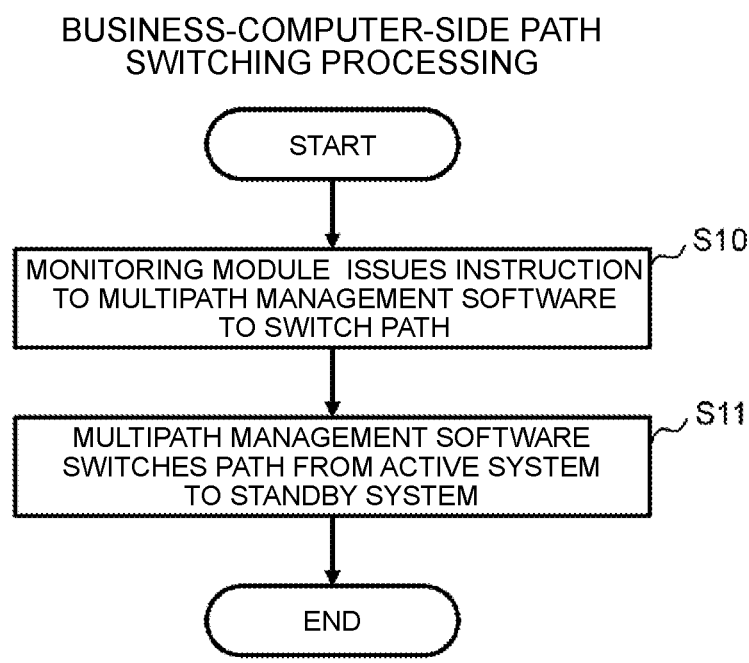
FIG. 11 is a flowchart illustrating a processing sequence for business-computer-side path switching processing.

FIG. 11 illustrates the specific processing content for the business-computer-side path switching processing executed by the business computer 2 to which such an instruction has been given.

In the business computer 2, when it is given the above-mentioned first path switching instruction, this businesscomputer-side path switching processing starts and the monitoring module 15 firstly issues the instruction to the multipath management software 14 (FIG. 1) to switch the logical path specified in the path switching instruction from the active system to the standby system (S10).

Furthermore, the multipath management software 14 given the above-mentioned instruction switches the specified logical path from the active system to the standby system (S11). With the above complete, this business-computer-side switching processing terminates.

(3-3) Path Switching Instruction Processing

Figure 12:
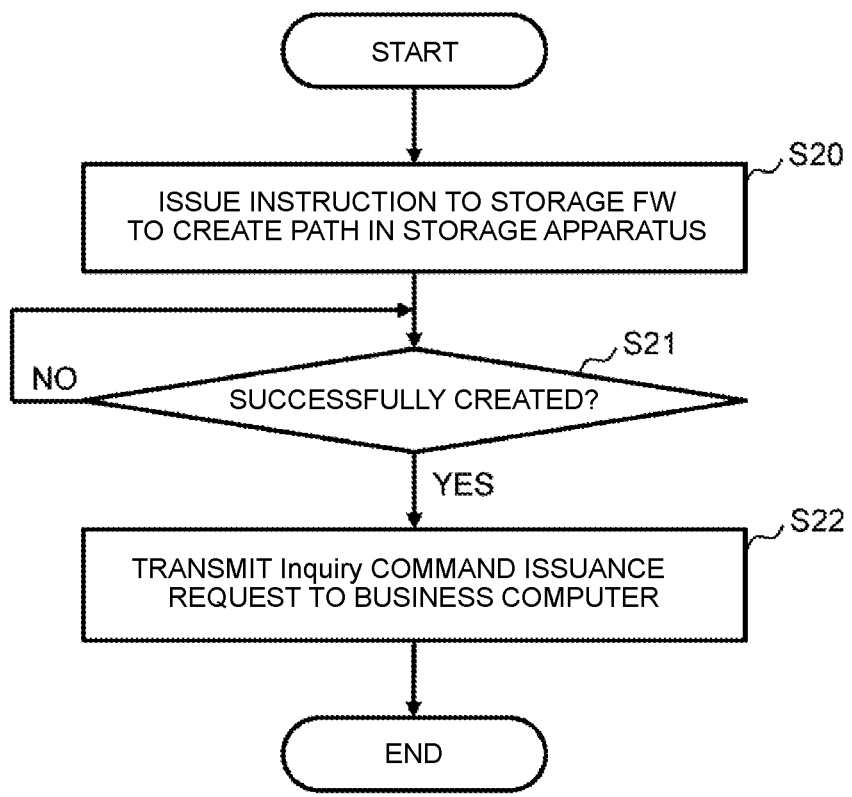
FIG. 12 is a flowchart illustrating a processing sequence for path switching instruction processing.

Meanwhile, FIG. 12 illustrates the content of the processing for the administrative manager 42 in step S9 in the case of an affirmative result in the path determination switching processing in step S4 described above with respect to FIG. 10.

In this case, when the administrative manager 42 proceeds to step S9, it starts the path switching instruction processing illustrated in this FIG. 12 and firstly issues the instruction to the storage firmware 34 (FIG. 1) of the storage apparatus 4 to create the new logical path in the storage apparatus 4 required in order to change the logical path combinations in each of the virtual machines in the system to the optimum combination pattern determined in step S8 (S20).

The administrative manager 42 then waits for the storage firmware 34 to finish creating the above-mentioned new logical path (S21). Furthermore, when the storage firmware 34 eventually finishes creating the above-mentioned new logical path, the administrative manager 42 sends an inquiry command issuance request to the business computer 2 that should create a new path (S22), and then it terminates the path switching processing.

Furthermore, the business computer 2 that receives the inquiry command issuance request then sends, in accordance with the issuance request, the inquiry command to the storage apparatus 4. As a result of this, the business computer 2 will detect the new logical path (including the WWN of the storage port 35 coupled to that logical path) created in the storage apparatus 4 in step S20.

In this way, the multipath management software 14 of the business computer 2 switches the logical path to the corresponding logical volume in the corresponding virtual machine to the logical path that reaches the corresponding logical volume via the logical path in the storage apparatus 4 detected at this time.

(3-4) Optimum Combination Pattern Determination Processing

Figure 13:
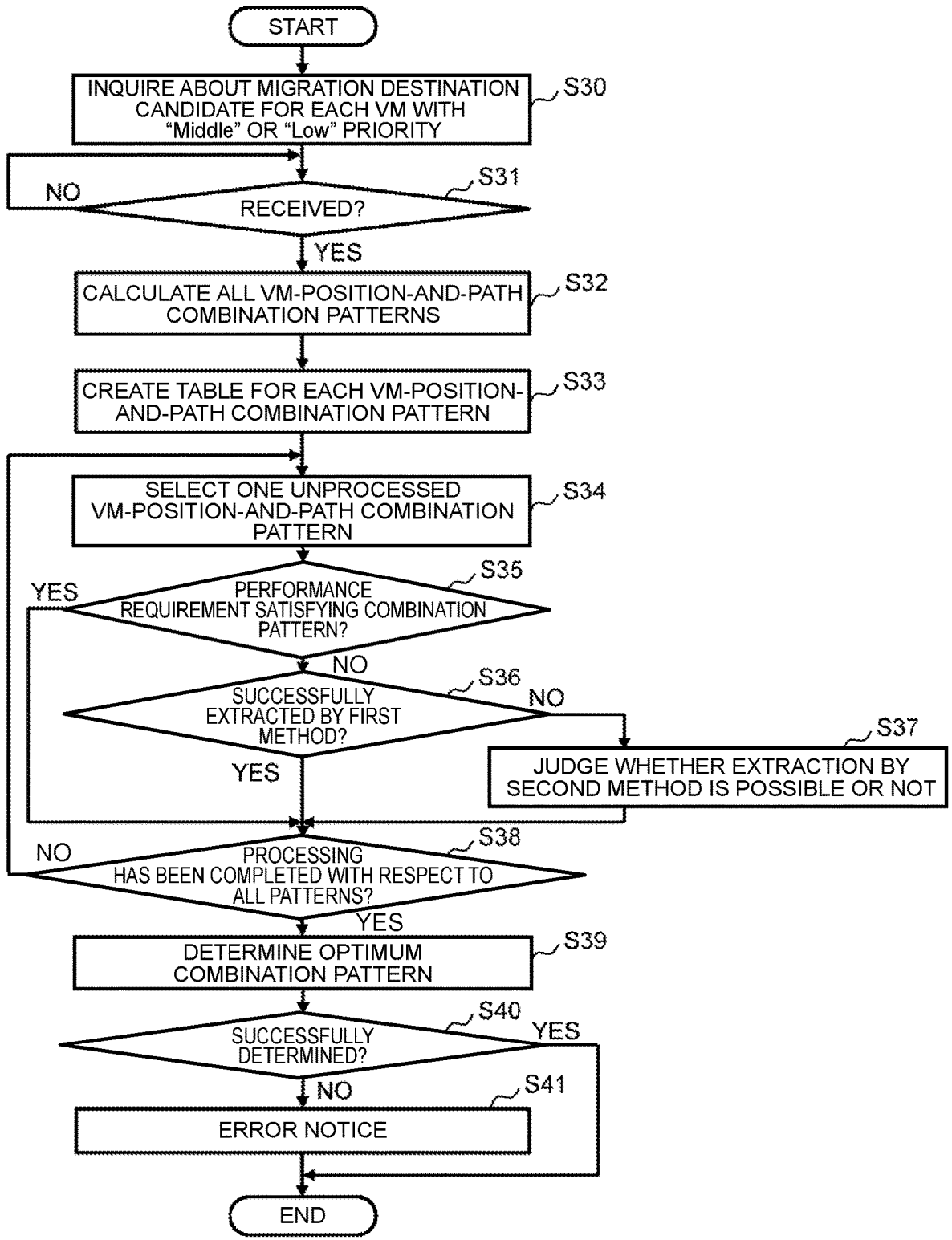
FIG. 13 is a flowchart illustrating a processing sequence for optimum combination pattern determination processing by the third method.

Meanwhile, FIG. 13 illustrates the content of the processing for the administrative manager 42 in step S8 in the case of an affirmative result in the path determination switching processing in step S6 described above with respect to FIG. 10.

In this case, when the administrative manager 42 proceeds to step S8, it starts the optimum combination pattern determination processing illustrated in this FIG. 13 and firstly makes an inquiry to the virtual environment integrated monitoring server 6 (FIG. 1) to see to which of the business computers 2 it can respectively migrate each of the virtual machines, from among the virtual machines existing in the system, for which the path switching priority has been set as either "Middle" or "Low" (S30).

In this way, the virtual environment integrated monitoring server 6, in response to the above-mentioned inquiry, extracts, for each of the virtual machines for which the path switching priority has been set as either "Middle" or "Low," the candidate business computers 2 that can become migration destinations (hereinafter referred to as "migration destination candidates").

Specifically, the virtual environment integrated monitoring server 6, extracts, for each of the virtual machines for which the path switching priority has been set as either "Middle" or "Low," all business computers 2 for which, even in the case of that virtual machine being migrated, the resource capacity for information processing resources such as the CPU 10 (FIG. 1) or memory 11 (FIG. 1) is below a threshold value set in advance for those information processing resources, and in which a physical path to the logical volume VOL (FIG. 1) being used by that virtual machine exists, as migration destination candidates for that virtual machine. The virtual environment integrated monitoring server 6 then notifies the administrative manager 42 of the migration destination candidates extracted in this way for each of the virtual machines for which the path switching priority has been set as either "Middle" or "Low."

Under this circumstance, the administrative manager 42 is waiting for the above-mentioned notification from the virtual environment integrated monitoring server 6 (S31). Then, when the administrative manager 42 receives the notification, it calculates, in the case of at least one of the virtual machines for which the path switching priority has been set as either "Middle" or "Low" being migrated to any of the migration destination candidates for that virtual machine, all combination patterns for the positions of each virtual machine (the combination patterns showing which virtual machine is inside which business computer 2; hereinafter referred to as the "virtual machine position combination patterns"). Furthermore, the administrative manager 42 calculates, for each of the calculated virtual machine position combination patterns, all combination patterns in the cases where a plurality of logical path combinations to respective corresponding logical volumes VOL exist from one or more migrated virtual machines (hereinafter referred to as "virtual-machine-position-and-path combination patterns") (S32).

Subsequently, the administrative manager 42 then, for each of the virtual-machine-position-and-path combination patterns calculated in this way, migrates the required virtual machines so that those combinations are formed, and creates each of the system information management table 45 (FIG. 8) and the storage port management table 46 (FIG. 9) for the case that assumes that respective logical paths have been set from each of the virtual machines migrated to form those combinations to the corresponding logical volumes VOL (S33).

Next, the administrative manager 42 selects, from among the virtual-machine-position-and-path combination patterns calculated in step S32, a single virtual-machine-position-and-path combination pattern for which step S35 and subsequent steps are yet to be executed (S34), and judges whether or not the selected virtual-machine-position-and-path combination pattern is an above-mentioned performance requirement satisfying combination pattern in which all of the virtual machines satisfy the path switching priority conditions and all of the virtual machines also satisfy the performance requirements (S35). Furthermore, if the administrative manager 42 obtains an affirmative result in this judgement, it proceeds to step S38.

On the other hand, if the administrative manager 42 obtains a negative result in the judgement in step S35, it executes the first performance requirement satisfying combination pattern extraction processing (refer to step S1 in FIG. 10) that extracts the performance requirement satisfying combination pattern using the first method described above with respect to FIG. 2A and FIG. 2B, and judges whether or not it has been able to extract the performance requirement satisfying combination pattern via the above-mentioned first performance requirement satisfying combination pattern extraction processing (S36). Furthermore, if the administrative manager 42 obtains an affirmative result in this judgement, it proceeds to step S38.

Meanwhile, if the administrative manager 42 obtains a negative result in the judgement in step S35, it executes the second performance requirement satisfying combination pattern extraction processing (refer to step S3 in FIG. 10) that extracts the performance requirement satisfying combination pattern using the second method described above with respect to FIG. 3A and FIG. 3B, and judges whether or not it has been able to extract the performance requirement satisfying combination pattern via the above-mentioned second performance requirement satisfying combination pattern extraction processing (S37).

Next, the administrative manager 42 then judges whether the execution of the processing in step S35 to step S37 has been completed being executed for all of the virtual-machine-position-and-path combination patterns calculated in step S32 (S38). Then, if the administrative manager 42 obtains a negative result in this judgement, it returns to step S34, and then it repeats the processing in step S34 to step S38 by sequentially switching the virtual-machine-position-and-path combination pattern to be selected in step 34 to another unprocessed virtual-machine-position-and-path combination pattern.

Furthermore, when the administrative manager 42 eventually obtains an affirmative result in step S38 by finishing the processing in step S35 to step S37 for all of the virtual-machine-position-and-path combination patterns calculated in step S32, it determines a single performance requirement satisfying combination pattern from among all of the performance requirement satisfying combination patterns extracted so far to be the optimum combination pattern (S39). Furthermore, as the method to determine the optimum combination pattern at this time, a method the same as the method to determine the optimum combination pattern using the first method described above with respect to FIG. 2A and FIG. 2B can be used.

Next, the administrative manager 42 judges whether it was able to determine the optimum combination pattern in step S39 (S40). Furthermore, if the administrative manager 42 obtains an affirmative result in this judgement, it terminates this optimum combination pattern determination processing, and returns to the path switching processing (FIG. 10).

Accordingly, in this case, the administrative manager 42, in step S9 of the path switching processing, first issues the instruction to the virtual environment integrated monitoring server 6 to migrate the required virtual machine to the business computer 2 conforming with the optimum combination pattern determined in step S39. In this way, the virtual environment integrated monitoring server 6, having received the above-mentioned instruction, controls the corresponding business computer 2 to cause the specified virtual machine to be migrated to the specified business computer 2. Furthermore, the administrative manager 42 then issues an instruction to the storage firmware 34 of the storage apparatus 4 and the monitoring module 15 of the corresponding business computer 2 to switch the logical paths in the required virtual machines so that the logical path combination in each of the virtual machines becomes that optimum combination pattern.

On the other hand, if the administrative manager 42 obtains a negative result in the judgement in step S40, it notifies the administrator of an error message that states that there is no path switching candidate (S41), and then it terminates this optimum combination pattern determination processing and returns to the path switching processing (FIG. 10).

Furthermore, cases in which a negative result is obtained in step S40 are cases in which no performance requirement satisfying combination pattern has been successfully extracted in step S37 with respect to all of the virtual-machine-position-and-path combination patterns calculated in step S32. In these cases, the administrative manager 42 returns to the path determination processing (FIG. 10), and then it terminates the path switching processing without executing the processing in step S9.

(4) Advantageous Effects of this Embodiment

With the information processing system 1 according to this embodiment, when the management computer 7 collects necessary information from each business computer 2, the storage apparatus 4, and the virtual environment integrated monitoring server 6 and is notified by any one the business computers 2 of an alert, the management computer 7: determines an optimum combination pattern which satisfies performance requirements for all the virtual machines and which also satisfies a requirement for a path switching priority that is set to each virtual machine, as a combination pattern of each logical path from each virtual machine to a logical volume allocated to that virtual machine; and issues an instruction to the corresponding business computer 2 and/or the storage apparatus 4 so that the combination pattern of each logical path from a virtual machine to a logical volume allocated to that virtual machine will become the determined optimum combination pattern.

In this case, with this information processing system 1, there is a possibility that a logical path from a virtual machine created in the business computer 2, regarding which no such alert has been reported, to a logical volume allocated to that virtual machine (that is, a logical path with no problem) may also be changed; however, the logical path for each virtual machine can be determined so that it will be an optimum logical path for the entire system.

Therefore, when this information processing system 1 is employed, the logical path for each virtual machine can be switched so that a combination of each logical path from each virtual machine to a logical volume allocated to that virtual machine will become an optimum combination for the entire system; and as a result, the reliability and safety of the entire system can be enhanced.

(5) Other Embodiments

Incidentally, the aforementioned embodiment has described the case where one administrative manager 42 is equipped with the function as the information collection unit collecting necessary information from each business computer 2 and the storage apparatus 4 and the function as the path switching control unit controlling switching of the logical path from each virtual machine to the logical volume allocated to that virtual machine on the basis of the information collected by the information collection unit; however, the present invention is not limited to this example and first software having a function as the information collection unit and second software having a function as the path switching control unit may be provided separately instead of the administrative manager 42.

Furthermore, the aforementioned embodiment has described the case where the path switching condition management table 16 is structured as illustrated in FIG. 5A and the path switching condition is set so that the data transfer volume of the business computer port 12 is checked as many times as the number of checks designated by the user within the designated time which is designated by the user and the number of times the data transfer volume within that designated time becomes less than the business computer port data transfer volume threshold designated by the user becomes equal to or more than the number of times designated by the user; however, the present invention is not limited to this example and a wide variety of other conditions can be applied as the above-mentioned path switching condition.

For example, the data transfer volume of each business computer port 12 is checked as many times as the number of times designated by the user (for examples, 10 times) within a certain period of time (for example, 60 seconds); and if a moving average value becomes equal to or less than a data transfer volume threshold designated by the user (for example, 300 MB/s), the monitoring module 15 may send an alert to the administrative manager 42.

Incidentally, in this case, a path switching condition management table 16" may be structured as illustrated in FIG. 5B. This path switching condition management table 16" includes a number-of-checks column 16A", a designated time column 16B", and a data transfer volume threshold column 16C". Then, the designated time which is designated by the user is stored in the designated time column 16A"; the number of checks designated by the user as the number of times the administrative manager 42 checks the data transfer volume of each business computer port 12 within that time is stored in the number of checks column 16B"; and the business computer port data transfer volume threshold which is designated by the user is stored in the data transfer volume threshold column 16C".

Furthermore, the aforementioned embodiment has described the case where the path switching priorities are set as three levels "High," "Middle," and "Low"; however, the present invention is not limited to this example and the path switching priorities may be set as 2 levels or 4 levels or more.

Furthermore, the aforementioned embodiment has described the case where a performance requirement satisfying combination pattern with the lowest number of logical path switching times is selected as an optimum combination pattern from among performance requirement satisfying combination patterns; however, the present invention is not limited to this example and, for example, a performance requirement satisfying combination pattern with the lowest number of logical path switching times for virtual machines whose path switching priority is set as "Middle" may be the optimum combination pattern and a wide variety of other methods can be applied as the method for determining the optimum combination pattern from among the performance requirement satisfying combination patterns. For example, the optimum combination pattern may be determined from among the performance requirement satisfying combination patterns in accordance with whatever rules in consideration of the number of logical path switching times and the number of logical path switching times for the virtual machines whose path switching priority is set as "Middle."

INDUSTRIAL APPLICABILITY

The present invention is suited for use in a management apparatus for managing logical paths form a business computer to a storage apparatus.

REFERENCE SIGNS LIST

1: information processing system
2: business computer
4: storage apparatus
6: virtual environment integrated monitoring server
7: management computer
10, 32, 40: CPU
11, 33, 41: memory
12: business computer port
14: multipath management software
15: monitoring module
16: path switching condition management table
30: storage device
31: controller
34: storage firmware
35: storage port
42: administrative manager
43: data transfer volume threshold management table
44: path switching predicted time management table
45: system information management table
46: storage port management table
VM: virtual machine
VOL: logical volume

The invention claimed is:

1. A management apparatus for managing an information processing system including one or more business computers to each of which one or more virtual machines are set, and a storage apparatus to which one or more logical volumes are set, the management apparatus comprising:
a memory;
an input/output device; and
a processor communicatively coupled to the memory and the input/output device, wherein the processor is configured to
collect necessary information from each of the business computers and the storage apparatus,
control switching of a logical path from each of the virtual machines to the logical volume allocated to the relevant virtual machine on the basis of the information collected,
receive an alert from the business computer when a load on the logical path from any one of the virtual machines to the logical volume allocated to the relevant virtual machine increases and a performance requirement which is set to the relevant virtual machine is thereby no longer satisfied,
set, to each of the virtual machines, as a priority representing a priority level when switching the logical path is sot to each of the virtual machines, a first priority to not change the logical path and a second priority capable of changing the logical path,
when the alert is received from the business computer, determines a new combination pattern, which satisfies performance requirements of all the virtual machines and satisfies a requirement for the priority that is set to each of the virtual machines, as a combination pattern of each logical path from each of the virtual machines to the logical volume allocated to the relevant virtual machine on the basis of the information collected and issues an instruction to the corresponding business computer and/or the storage apparatus to switch the logical path for the virtual machine which is required so that the combination pattern of each logical path from each of the virtual machines to the logical volume allocated to the relevant virtual machine will be switched to the determined combination pattern, judge whether the new combination pattern which satisfies the performance requirements of all the virtual machines and satisfies the requirement for the priority that is set to each of the virtual machines can be determined or not by any one of: a first method of switching the logical path for some or all of the virtual machines, for which the priority is set as the second priority, from an active system to a standby system, a second method of newly creating the logical path for some or all of the virtual machines, for which the priority is set as the second priority, if the combination pattern fails to be determined by the first method, and a third method of migrating some or all of the virtual machines, for which the priority is set as the second priority, to another business computer;

determines the new combination pattern based on a result of the judgment, when a plurality of new combination patterns, which satisfy the performance requirements of all the virtual machines and satisfy the requirement for the priority that is set to each of the virtual machines, are successfully extracted by any one of the first, method to the third method, determine the combination pattern with a lowest number of times of switching the logical path, from among the plurality of extracted combination patterns, as the new combination pattern;

and switches the logical path, from each of the virtual machines to the logical volume, in accordance the new combination pattern.

2. The management apparatus according to claim 1 wherein the processor:

judges whether the new combination pattern which satisfies the performance requirements of all the virtual machines and satisfies the requirement for the priority that is set to each of the virtual machines can be determined or not by the first method;

judges whether the new combination pattern which satisfies the performance requirements of all the virtual machines and satisfies the requirement for the priority that is set to each of the virtual machines can be determined or not by the second method if the combination pattern fails to be determined by the first method; and judges whether the new combination pattern which satisfies the performance requirements of all the virtual machines and satisfies the requirement for the priority that is set to each of the virtual machines can be determined or not by the third method if the new combination pattern which satisfies the performance requirements of all the virtual machines and satisfies the requirement for the priority that is set to each of the virtual machines still fails to be determined by the second method.

3. The management apparatus according to claim 2, wherein the processor switches a processing order of the first method and the second method so that the judgment according to the first method will be executed after the judgment according to the second method in accordance with an external operation.

4. A management method executed by a management apparatus for managing an information processing system including one or more business computers to each of which one or more virtual machines are set, and a storage apparatus to which one or more logical volumes are set, the management method comprising:

collecting necessary information from each of the business computers and the storage apparatus; and controlling switching of a logical path from each of the virtual machines to the logical volume allocated to the relevant virtual machine on the basis of the collected information;

receiving, an alert from the business computer when a load on the logical path from any one of the virtual machines to the logical volume allocated to the relevant virtual machine increases and a performance requirement which is set to the relevant virtual machine is thereby no longer satisfied;

set, to each of the virtual machines, as a priority representing a priority level when switching the logical path, a first priority to not change the logical path and a second priority capable of changing the logical path;

when the management apparatus is notified by the business computer of the alert, determining a new combination pattern, which satisfies performance requirements of all the virtual machines and satisfies a requirement for the priority that is set to each of the virtual machines, as a combination pattern of each logical path from each of the virtual machines to the logical volume allocated to the relevant virtual machine on the basis of the collected information and issuing an instruction to the corresponding business computer and/or the storage apparatus to switch the logical path for the virtual machine which is required so that the combination pattern of each logical path from each of the virtual machines to the logical volume allocated to the relevant virtual machine will be switched to the determined combination pattern;

judging whether the new combination pattern which satisfies the performance requirements of all the virtual machines and satisfies the requirement for the priority that is set to each of the virtual machines can be determined or not by any one of: a first method of switching the logical path for some or all of the virtual machines, for which the priority is set as the second priority, from an active system to a standby system; a second method of newly creating the logical path for some or all of the virtual machines, for which the priority is set as the second priority, if the combination pattern fails to be determined by the first method; and a third method of migrating some or all of the virtual machines, for which the priority is set as the second priority, to another business computer;

determines the new combination pattern based on a result of the judgment;

when a plurality of new combination patterns, which satisfy the performance requirements of all the virtual machines and satisfy the requirement for the priority that is set to each of the virtual machines, are successfully extracted by any one of the first method to the third method, determining the combination pattern with a lowest number of times of switching the logical path, from among the plurality of extracted combination patterns, as the new combination pattern; and switches the logical path, from each of the virtual machines to the logical volume, in accordance the new combination pattern.

5. The management method according to claim 4, wherein the management apparatus:

judges whether the new combination pattern which satisfies the performance requirements of all the virtual machines and satisfies the requirement for the priority that is set to each of the virtual machines can be determined or not by the first method;

judges whether the new combination pattern which satisfies the performance requirements of all the virtual machines and satisfies the requirement for the priority that is set to each of the virtual machines can be determined or not by the second method if the combination pattern fails to be determined by the first method; and judges whether the new combination pattern which satisfies the performance requirements of all the virtual machines and satisfies the requirement for the priority that is set to each of the virtual machines can be determined or not by the third method if the new combination pattern which satisfies the performance requirements of all the virtual machines and satisfies the requirement for the priority that is set to each of the virtual machines still fails to be determined by the second method.

6. The management method according to claim 5, wherein the management apparatus switches a processing order of the first method and the second method so that the judgment according to the first method will be executed after the judgment according to the second method in accordance with an external operation.

* * * * *